United States Patent [19]
Mackre

[11] Patent Number: 6,128,317
[45] Date of Patent: Oct. 3, 2000

[54] TRANSMITTER AND RECEIVER SUPPORTING DIFFERING SPEED CODECS OVER SINGLE LINKS

[75] Inventor: Francois Mackre, Austin, Tex.

[73] Assignee: Motorola, Inc., Schaumburg, Ill.

[21] Appl. No.: 08/996,165

[22] Filed: Dec. 22, 1997

[51] Int. Cl.[7] .................................................... H04J 13/00
[52] U.S. Cl. ...................... 370/479; 370/466; 370/490; 370/522
[58] Field of Search ................................... 370/342, 441, 370/442, 462, 477, 479, 490, 493, 494, 495, 522, 465, 466, 467

[56] References Cited

U.S. PATENT DOCUMENTS 4,813,040  3/1989  Futato ....................................... 370/477
5,122,875  6/1992  Raychaudhuri et al. ................ 370/462

*Primary Examiner*—Douglas W. Olms
*Assistant Examiner*—Shick Hom

[57] ABSTRACT

A synchronous serial protocol is used to transfer data from a host processor (102) to multiple CODECs (112) operating at differing speeds and from such CODECs (112) back to the host processor (102) across a bidirectional pair of serial links (134, 136). A link speed fast enough to accommodate all operating CODECs (112) is utilized. Frames are transmitted across the bidirectional pair of serial links (134, 136) controlled by frame sync (132) and bit clock (130) signals. Each frame has a control word of validity bits followed by one data word for each active CODEC (112). The validity bits determine whether the corresponding data word contains valid data for or from the corresponding CODEC (112).

21 Claims, 8 Drawing Sheets

TRANSMITTER AND RECEIVER SUPPORTING DIFFERING SPEED CODECS OVER SINGLE LINKS

FIELD OF THE INVENTION

The present invention generally relates to digital electronic devices, and more specifically to communications protocols for the such devices.

BACKGROUND OF THE INVENTION

Time division multiplexing (TDM) has been a preferred choice for multiplexing digital streams of data from/to multiple termination devices to/from a unique processing unit (host controller) through a serial interface. The pursued goal is in most cases hardware and wiring elimination to take advantage of the processing power of the host controller.

Simple implementations of this technique carry the following restrictions:

the master clocking of the serial link is a constant frequency, and the data rate of each terminal point is constant to avoid complex channel bandwidth management.

The repetition period is broken into equal time segments (called timeslots) and each interval is associated with a communication channel to/from a terminal device thus creating a 'virtual' connection. Constant data rate is often referred as 'synchronous' data transfer.

To overcome the previous mentioned restrictions, prior art systems implement elaborated control channel mechanism, rely on data buffering into FIFO memories (that introduce delays) and/or require dedicated non standard serial interface on the host processor.

There is a need for overcoming the previous mentioned restrictions allowing synchronous transfer of data with several data processing terminations over a single serial interface (data rate of each termination device is independent). This should be achieved without any complex associated control or large buffering. The serial interface on the host processor should also not require any additional nonstandard hardware.

One recent attempt to solve these problems is the Audio Codec 97 specification (AC97). The concept of having multiple codes on a single serial link and a validity tag to describe the content of each channel on the link is specified there. However the AC97 validity bit describes a static status (presence/absence) of each terminal device. Moreover every CODEC is operated at a constant sampling rate (48 Kss) and the serial link clock is also constant. Additionally the AC97 serial interface proposed implementation is not standard and relies on a dedicated AC97 controller.

There thus remains a need for an interface that provides for the transport of multiple variable rate data streams on a single serial link. Control overhead should be minimized. The interface should be operable with non-constant clocking. Finally, data delay should be minimal to accommodate real-time data.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

In the following description, numerous specific details are set forth such as specific word, codeword, or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

A synchronous serial protocol is used to transfer data from a host processor to multiple coders/decoders (CODECs) operating at differing speeds and from such CODECs back to the host processor across a bidirectional pair of serial links. A link speed fast enough to accommodate all operating CODECs is utilized. Frames are transmitted across the bidirectional pair of serial links controlled by frame sync and bit clock signals. Each frame has a data word of validity bits followed by one data word for each active CODEC. The validity bits determine whether the corresponding data word contains valid data for or from the corresponding CODEC.

Figure 1:
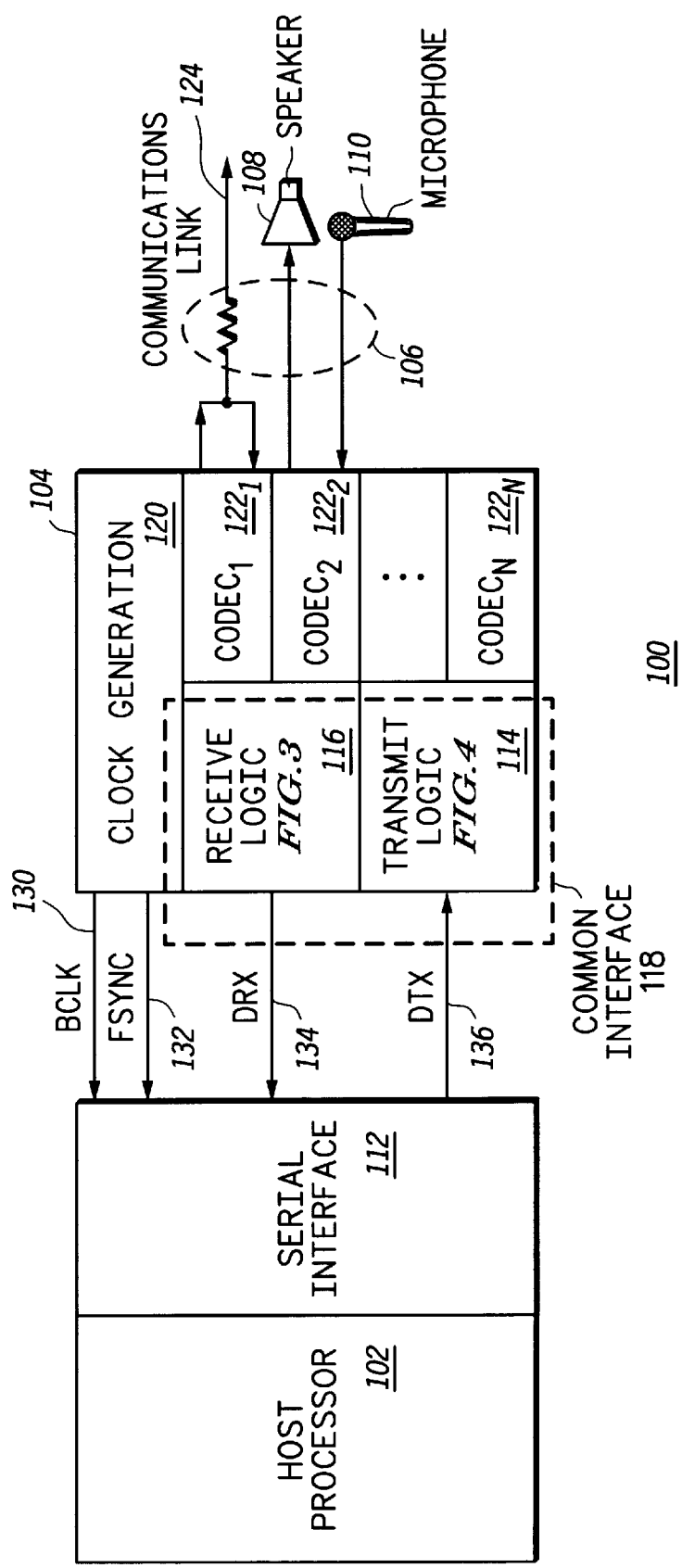
FIG. 1 is a block diagram illustrating a data communications system constructed in accordance with the present invention.

FIG. 1 is a block diagram illustrating a data communications system 100 constructed in accordance with the present invention. Data communications system 100 comprises a host processor 102 and a multi-function communications device (MFCD) 104. Data communications system (DCS) 100 transmits data to and receives data from a wide variety of sources 106. In the depicted embodiment, the sources 106 include a communications link 124, typically a telephone line, a speaker 108, and a microphone 110. The DCS 100 can process data that is received or transmitted at different rates with respect to each source 106. Furthermore, the different transmission rates may change as the demands of a particular source change.

Continuing with FIG. 1, the host processor 102 includes a serial interface 112, coupled to the MFCD 104.

Specifically, the serial interface 112 generates a control signal "DATA TRANSMIT" (DTX) 136 which is received by a transmit logic unit 114. Conversely, a receive logic unit 116 generates a control signal "DATA RECEIVE" (DRX) 134 which is received by the serial interface 112. The receive logic unit 116 and the transmit logic unit 114 comprise a common interface unit 118 of the MFCD 104. The receive logic unit 116 and the transmit logic unit 114 are more fully described below in connection with FIGS. 3 and 4, respectively. The MFCD 104 also comprises a clock generation unit 120 and N coder/decoders (CODECs) $122_1$ through $122_N$. The Clock generation unit 120 generates two timing signals: "BIT CLOCK" (BCLK) 130 and "FRAME SYNC" (FSYNC) 132 coupled to the serial interface 112. In the depicted embodiment, a first CODEC $122_1$ is coupled to a communications link 124, while a second CODEC $122_2$ is coupled to the speaker 108 and to the microphone 110.

Figure 2:
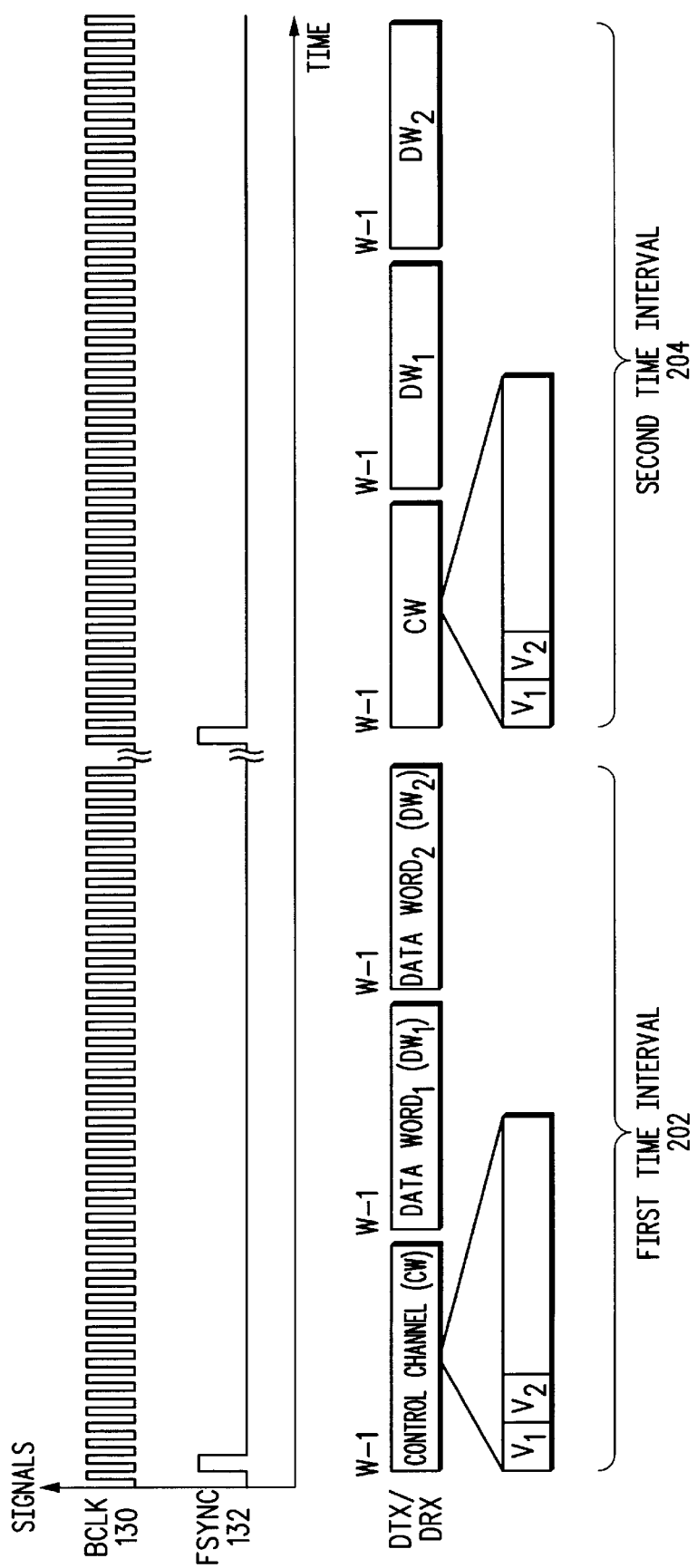
FIG. 2 is a graphical representation of the protocol used by the data communications system illustrated in FIG. 1.

FIG. 2 is a graphical representation 200 of the protocol used by the data communications system 100 illustrated in FIG. 1. In the preferred embodiment, the DCS 100 is a full duplex device. The DCS 100 transmits a single data stream from the host processor 102 via the serial interface 112 using the control signal DTX 136 to the transmit logic unit 114. Transmit logic unit 114 then distributes portions of the single data stream to the appropriate CODECs 122. The CODECs 122 in turn process separate data streams to separate sources 106. Similarly, data from the various sources 106 is processed in parallel by their associated CODECs 122 and then combined into a single data stream by receive logic unit 116. This single data stream is then received by the host processor 102 via serial interface 112 and through control signal DRX 134. The host processor 102 can then separate the single data stream for subsequent action. As described above, the various sources can each have a different sampling rate, which change over time. The host processor 102 adjusts its protocol to mirror these rates.

All operations are synchronized to the clocking signal BCLK 130 and FSYNC 132. The BCLK 130 signal defines the duration of a single bit transfer. In the depicted embodiment, CODECs $122_1$ through $122_N$ are implemented as oversampled analog-to-digital (A/D) and digital-to-analog (D/A) converters. Such technology provides a high frequency clock signal from which the BCLK 130 signal is derived. The FSYNC 132 signal defines the time interval or "frame" during which one data word is transferred between the host processor and each CODEC122. The rate of the FSYNC 132 signal must be at least equal to the fastest transmission rate of CODECs $122_1$ through $122_N$. Also, the ratio of the frequency of the BCLK 130 signal to the FSYNC 132 signal must be large enough to allow the transmission of all CODEC data signals and a control word. In one embodiment, the BCLK 130 signal is approximately 1 megahertz (MHz) and the FSYNC 132 signal is approximately 16 kilohertz (KHz). The ratio of the frequency of the BCLK 130 signal to the FSYNC 132 signal is therefore 64 in that example. This ratio allows 64 bits or one 16-bit control word (CW) and up to three 16-bit data words (DW) to be transmitted in each frame. One skilled in the art can adjust the rates for the BCLK 130 and FSYNC 132 signals to accommodate a particular number and variety of CODECs 122 required by a particular application. The clock generation unit 104 provides the BCLK 130 and FSYNC 132 signals according to these design constraints.

Continuing with the example, a frame, containing three codewords are transmitted between host processor 102 and MFCD 104.

In the case of a data transmit operation, the host processor 102 generates a control word for each frame. The control word includes a valid bit for each $CODEC_i$ $122_i$ (here N equals two for convenience). In the case of a transmit operation, the host processor 102 uses the valid bit to match the output rate of the destination CODEC relative to the FSYNC 132 signal rate. For instance, CODEC $122_1$ may operate at a rate "X" and CODEC $122_2$ may operate at a rate X/2. In this case, clock generation unit 120 will adjust the rate of the FSYNC 132 signal to X allowing host processor 102 to transmit data to the MFCD 104 for CODEC $122_1$ each frame. Therefore, the valid bit associated with CODEC $122_1$ will be set each frame. However, the host processor 102 will transmit data to the MFCD 104 for CODEC $122_2$ every other frame. In this case, the valid bit associated with CODEC $122_2$ will be set every other frame. The apparent effect of this protocol is to throttle data to each CODEC 122 as required by the rate that the particular CODEC 122 consumes data.

In the preferred embodiment, the host processor 102 derives the pattern of valid bits according to a particular algorithm: For each frame "i", the host processor 102 calculates an intermediate valid value $IV_i=[i(T1/T2)]$, where "i" is an integer index, "T1" is the rate of the FSYNC signal (typically equal to the fastest CODEC 122), "T2" is the rate of the CODEC 122 whose validity bit pattern is to be calculated, and where brackets ("[", "]") indicate that the take-the-integer-part function. If $IV_i$ equals $IV_{i-1}$, then the corresponding validity bit is cleared. Otherwise, the validity bit is set. In one embodiment of the invention, the sequence of valid bits for popular frequency ratios is stored in read-only memory (ROM) for rapid use. For example, the ratio 2:3 generates the pattern %110 (binary). The algorithm just described, in conjunction with the circuits depicted in FIGS. 3 and 4, ensure that DCS 100 operates correctly regardless of the phase relationship between any CODEC 122 and serial interface 112.

FIG. 2 is a graphical representation of the protocol used by the data communications system 100 illustrated in FIG. 1. The Bit Clock (BCLK) 130 signal clocks each bit transmitted (DTX 136) and received (DRX 134) between the serial interface 112 and the MFCD 104. The Frame Sync (FSYNC) 132 signal indicates the start of each frame transmitted between the serial interface 112 and the MFCD 104.

The example in FIG. 2 illustrates transmission for two channels or CODECs $122_1$, $122_2$ over two time intervals: a First Time Interval 202, and a Second Time Interval 204. Each frame consists of a control channel codeword (CW) followed by a series of data codewords ($DW_i$), with one Data Word ($DW_0$, $DW_1$) for each active channel or CODEC $122_1$, $122_2$. The control channel word (CW) contains a valid bit ($V_i$) for each active channel or CODEC $122_1$, $122_2$. The Control Word validity bit ($V_i$) for a given $channel_i$ or CODEC $122_i$ indicates whether or not the corresponding Data Word ($DW_i$) contains valid data. For each of the two time intervals 202, 204 shown in the example, the frame transmitted contains a sixteen bit control word (CW) followed by two sixteen bit data codewords ($DW_i$), corresponding to two channels or CODECs $122_1$, $122_2$. The control word contains a corresponding valid bit ($V_1$, $V_2$) for each of the two active channels or CODECs $122_1$, $122_2$ indicating whether or not the corresponding Data Words ($DW_1$, $DW_2$) in the frame contain valid data.

It should be noted that the protocol supports full duplex operation, with data transmitted from the MFCD 104 to the serial interface 112 with the DRX 134 signal, and data transmitted from the serial interface 112 to the MFCD 104 with the DTX 136 signal, using the BCLK 130 and FSYNC 132 signals to synchronize transmissions simultaneously in both directions.

In the case of a data receive operation, receive logic unit 116 generates a control word for each frame. The receive logic unit 116 uses the same transfer formatting as the transmit operation. The control word includes a valid bit ($V_i$) for each $CODEC_i$ (here N equals two for convenience). In the case of a transmit operation, the host processor 102 uses the valid bit ($V_i$) to match the output rate of the destination $CODEC_i$ relative to the frame sync (FSYNC 132) rate. In the case of a receive operation, the host processor 102 uses the valid bit ($V_i$) to discard data codewords ($DW_i$) flagged as "invalid" by valid bit ($V_i$) in control word CW. For instance, a first CODEC $122_1$ may operate at a rate X and a second CODEC $122_2$ may operate at a rate X/2. In this case, clock generation unit 120 will adjust the frame sync (FSYNC 132) rate to X allowing host processor 102 to transmit data to the MFCD 104 for the first CODEC $122_1$ each frame. Therefore, the valid bit ($V_1$)associated with the first CODEC $122_1$ will be set each frame. However, the valid bit ($V_2$) associated with the second $CODEC_2$ $122_2$ will be set every other frame. Thus, in response to the valid bit ($V_2$) being clear for every other frame, the host processor 102 will ignore the incoming data from the MFCD 104 for the second $CODEC_2$ $122_2$ every other frame. The apparent effect of this protocol is to receive data from each $CODEC_i$ $122_i$ at the rate that the particular $CODEC_i$ $122_i$ generates data.

Figure 3:
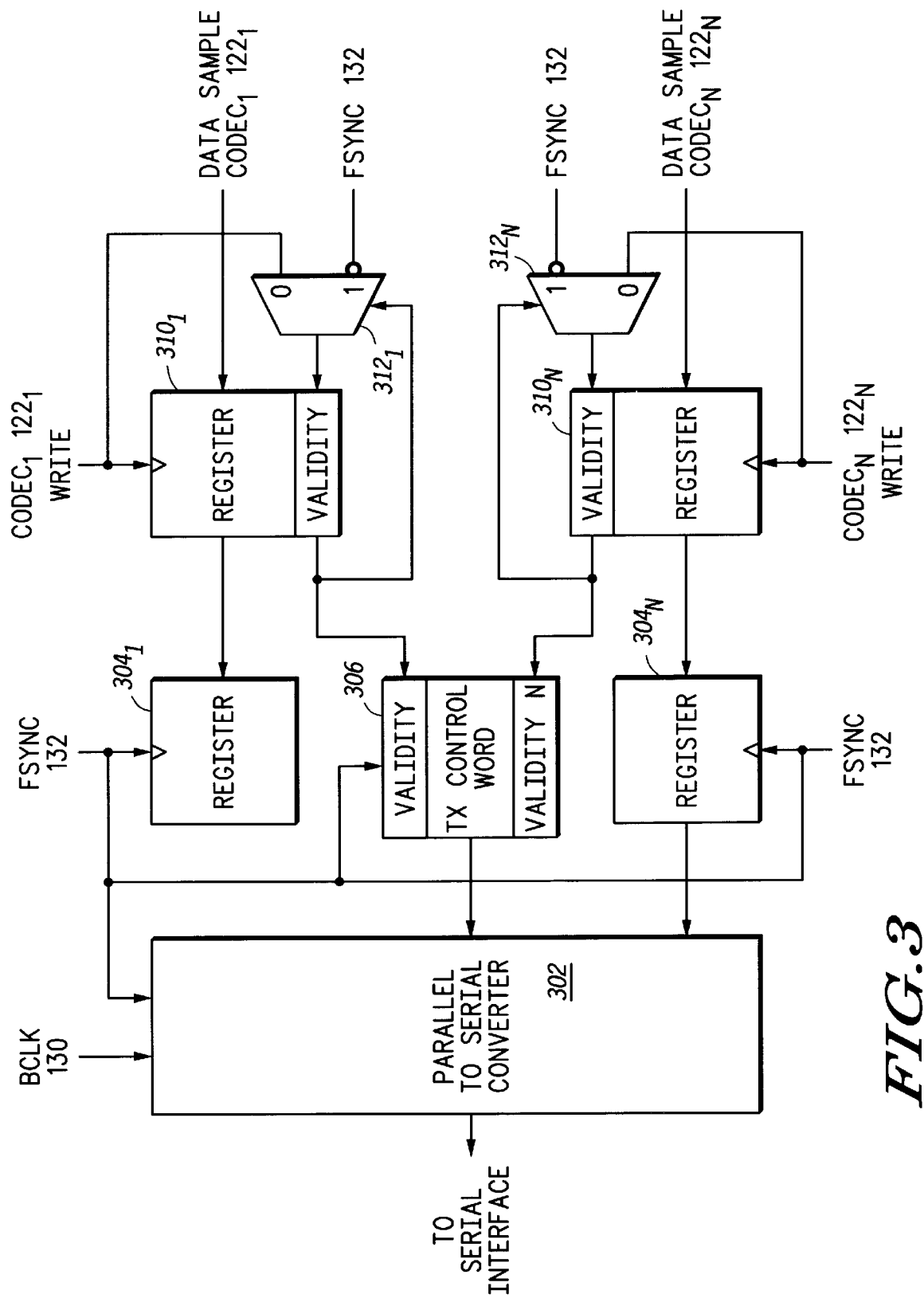
FIG. 3 is a block diagram illustrating a portion of the receive logic depicted in FIG. 1.

FIG. 3 is a block diagram illustrating the parallel to serial conversion circuitry used to transmit from the Receive Logic 116 portion of the MFCD 104. Data bits are received from each $CODEC_i$ $122_i$ and clocked into a corresponding register $310_i$ when a corresponding CODEC Write signal is asserted. The CODEC Write signal is also one of the two inputs of a corresponding 2x1 MUX $312_i$. The second input to the corresponding 2x1 MUX $312_i$ is the Frame Sync (FSYNC) 132 signal. The output of each 2x1 MUX $312_i$ is captured in a corresponding validity flip-flop within registers 310; also controlled by the corresponding CODEC Write signal. Each corresponding 2x1 MUX $312_i$ is controlled by the output of the corresponding validity flip-flop. The output of each of the validity flip-flops is also captured in a corresponding valid bit location in a control word buffer 306. The data from each of the serial data capture registers $310_i$ is registered in a corresponding output data register $304_i$, and the corresponding validity bits are registered in the output control word register 306 by assertion of the Frame Sync 132 signal.

Finally, a Parallel to Serial converter circuit 302 serially transmits as the DRX signal 134 the contents of the output control word register 306 followed by the contents of each of the output data codeword registers $304_i$, with one bit being transmitted each time the Bit Clock (BCLK) 130 signal is asserted. This sequence is restarted each time the Frame Sync (FSYNC) 132 signal is asserted, starting with transmission of the first bit of the output control word register 306 and proceeding serially transmitting each bit in the output control word register 306 followed by the contents of each of the output data registers $304_i$, clocking out one bit each time the Bit Clock (BCLK) 130 signal is asserted.

Figure 4:
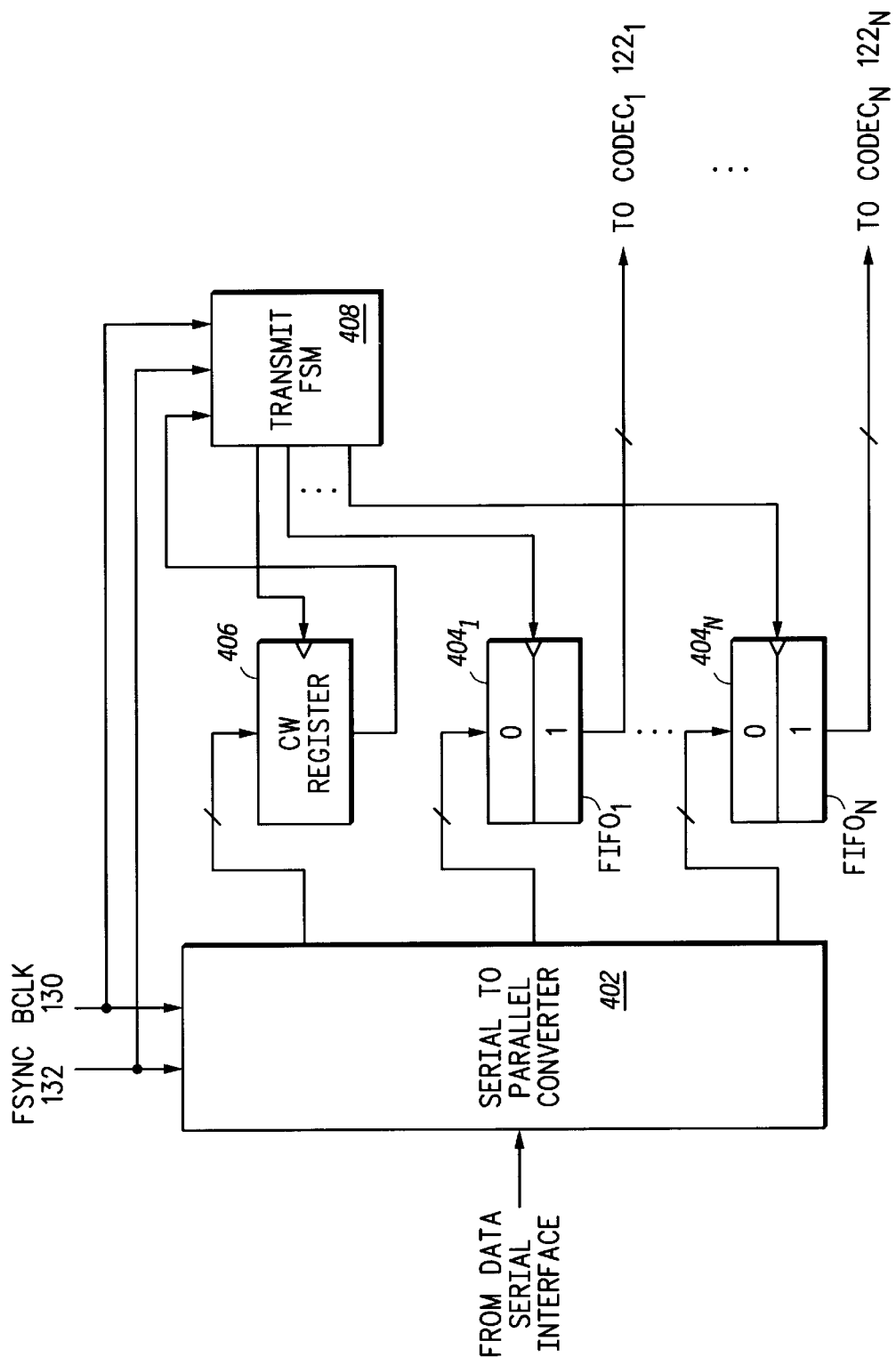
FIG. 4 is a block diagram illustrating a portion of the transmit logic depicted in FIG. 1.

FIG. 4 is a block diagram illustrating the serial to parallel conversion circuitry contained in the transmit logic 114 for receiving frames of data from the serial interface 112 via the DTX signal 136 and transmitting the included data codewords ($DW_i$) to the corresponding CODECs $112_i$. Bits are received one at a time via the DTX signal 136 line and accumulated into codeword sized units by a serial to parallel converter circuit 402. Assertion of the Frame Sync (FSYNC) 132 signal starts the accumulation, and a single bit is serially shifted into a codeword length register every time the Byte Clock (BCLK) 130 signal is asserted. Whenever a full codeword has been accumulated in the input shift register in the serial to parallel converter circuit 402, it is transmitted to a control word register 406, and a two-entry FIFO register $404_i$ corresponding to each of the CODECs $122_i$. Clocking into or registration in the control word register 406, and the two-entry FIFO registers $404_i$ corresponding to each of the CODECs $122_i$ is controlled by signals from a Transmit Finite State Machine (FSM) 408. Inputs to the Transmit Finite State Machine (FSM) 408 are the control word register 406 and the FSYNC 132 and BCLK 130 signals.

Figure 5:
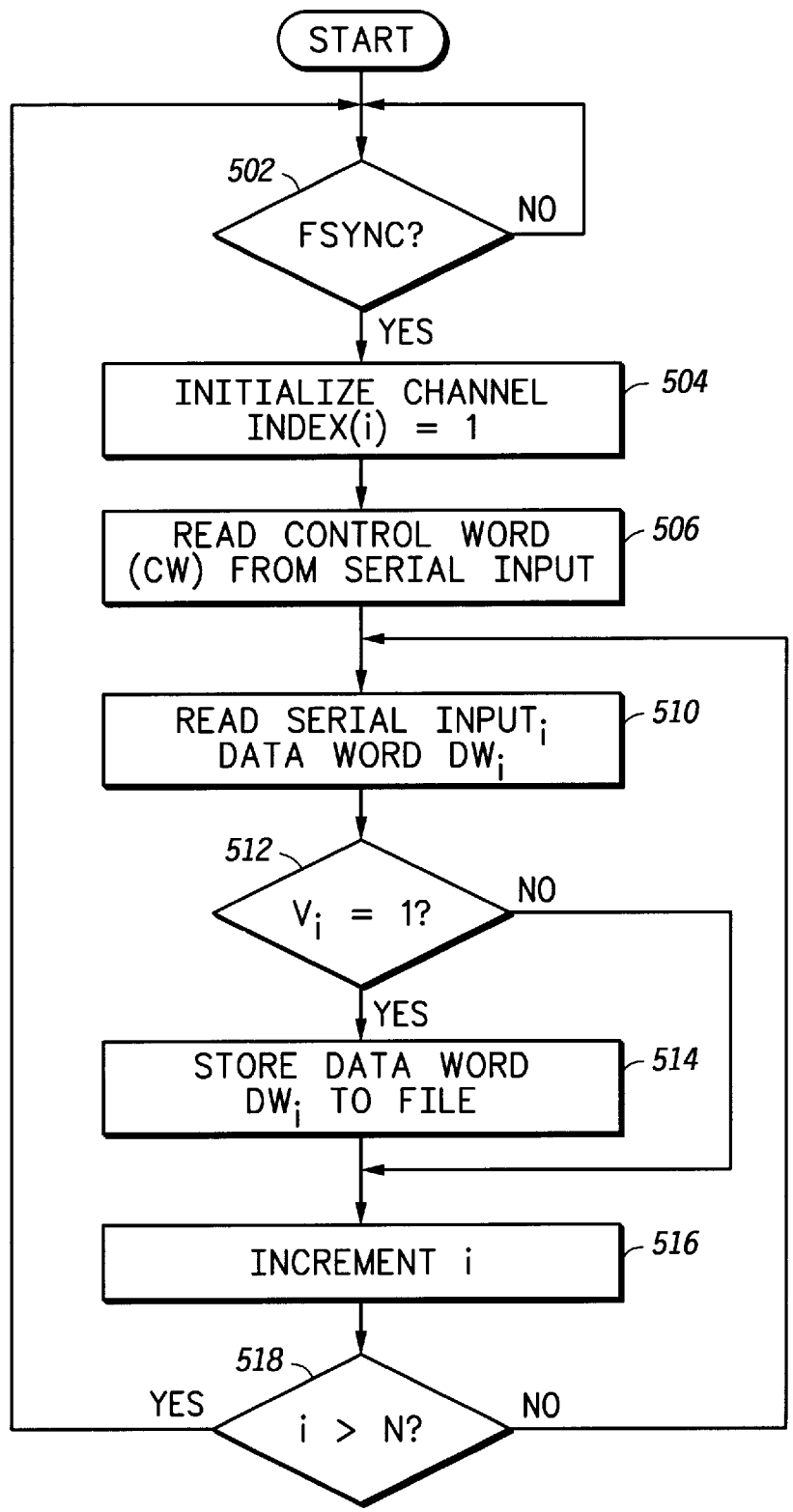
FIG. 5 is a flowchart illustrating operation of the host processor in a receive mode of operation.

FIG. 5 is a flowchart illustrating operation of the host processor 102 in a receive mode of operation used to receive and unblock frames of data from the Receive Logic circuit 116. The flow starts by waiting until a Frame Sync (FSYNC) 132 signal assertion is received, step 502. This is shown in the flow chart as a loop repeating the test for FSYNC 132 assertion until the signal assertion is received. The FSYNC 132 signal assertion, step 502, indicates that a new frame is starting to arrive over the DRX 134 signal line and therefore in a steady operational state a full frame is available in the receive buffer. Once the FSYNC 132 signal assertion has been received, a channel index ("i") is initialized, step 504, and the control word (CW) is read from the serial input, step 506. Then an inner loop is entered, and a codeword of serial input bits is read from the serial input stream into a Data Word ($DW_i$) corresponding to the channel index ("i"), step 510. A test is then made whether the corresponding valid bit in the control word ($V_i$) is set, step 512. If the corresponding control word valid bit ($V_i$) is set, step 512, the corresponding Data Word ($DW_i$) is stored in a buffer for further processing by the host processor 102, step 514. In any case, the channel index ("i") is then incremented, step 516, and a is test made as to whether the channel index ("i") is greater than the maximum number ("N") of supported channels, step 518. If the index ("i") is less than or equal to the maximum number ("N") of supported channels, the inner loop is repeated, and the next Data Word ($DW_i$) is read from the serial input stream, step 510. Otherwise, an outer loop is repeated, starting with the test for assertion of the FSYNC 132 signal, step 502.

Figure 6:
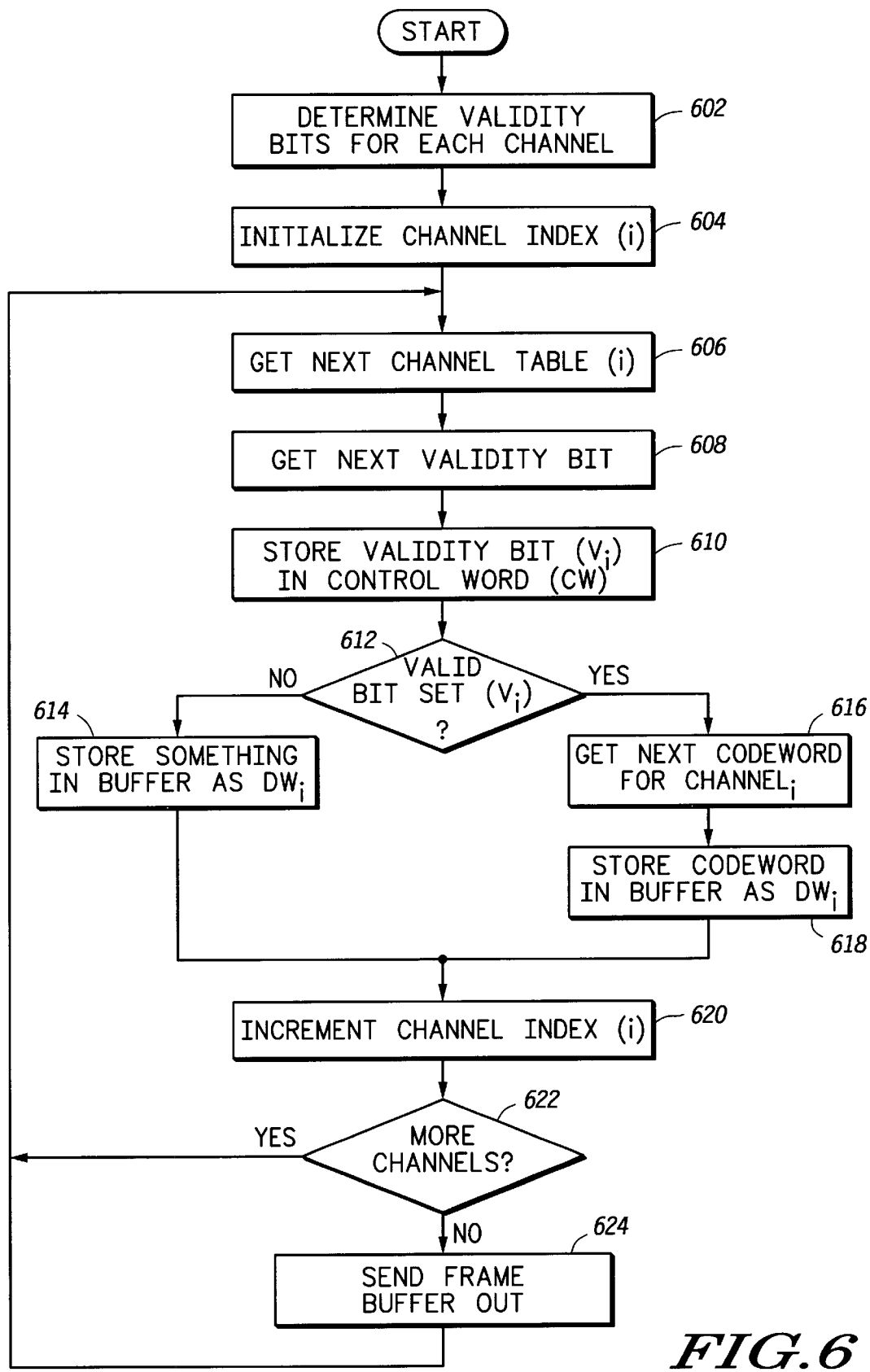
FIG. 6 is a flowchart illustrating operation of the host processor in a transmit mode of operation.

FIG. 6 is a flowchart illustrating operation of the host processor 102 in a transmit mode of operation to block and transmit frames of data words from the serial interface 112 to the transmit logic circuit 114. It starts for each frame by testing to determine which validity bits to set for each of the channels, step 602. This is followed by initializing a channel index ("i"), step 604. A loop is then entered, and the next channel table is selected, step 606. The validity bit for that next channel table is moved from the channel table entry, step 608, and stored in the outgoing control word ($CW_i$), step 610. A test is then made whether the validity bit ($V_i$) is set, step 612. If the validity bit ($V_i$) is set, step 612, the next data codeword for the channel is moved, step 616, into the outgoing frame buffer as the corresponding Data Word ($DW_i$), step 618. Otherwise, the value stored in the corresponding Data Word ($DW_i$) is irrelevant, step 614, since it will be ignored when received by the Receive Logic circuit 116. In either case, the channel index ("i") is incremented, 620, and a test is made whether more channels remain to be processed, step 622. As long as more channels remain to be processed, step 622, the loop is repeated, starting with selecting the next channel table, step 602. When no more channels remain to be processed, step 622, the frame buffer is transmitted to the Transmit Logic circuit 114, and the flow is complete until the next output frame is built.

Figure 7:
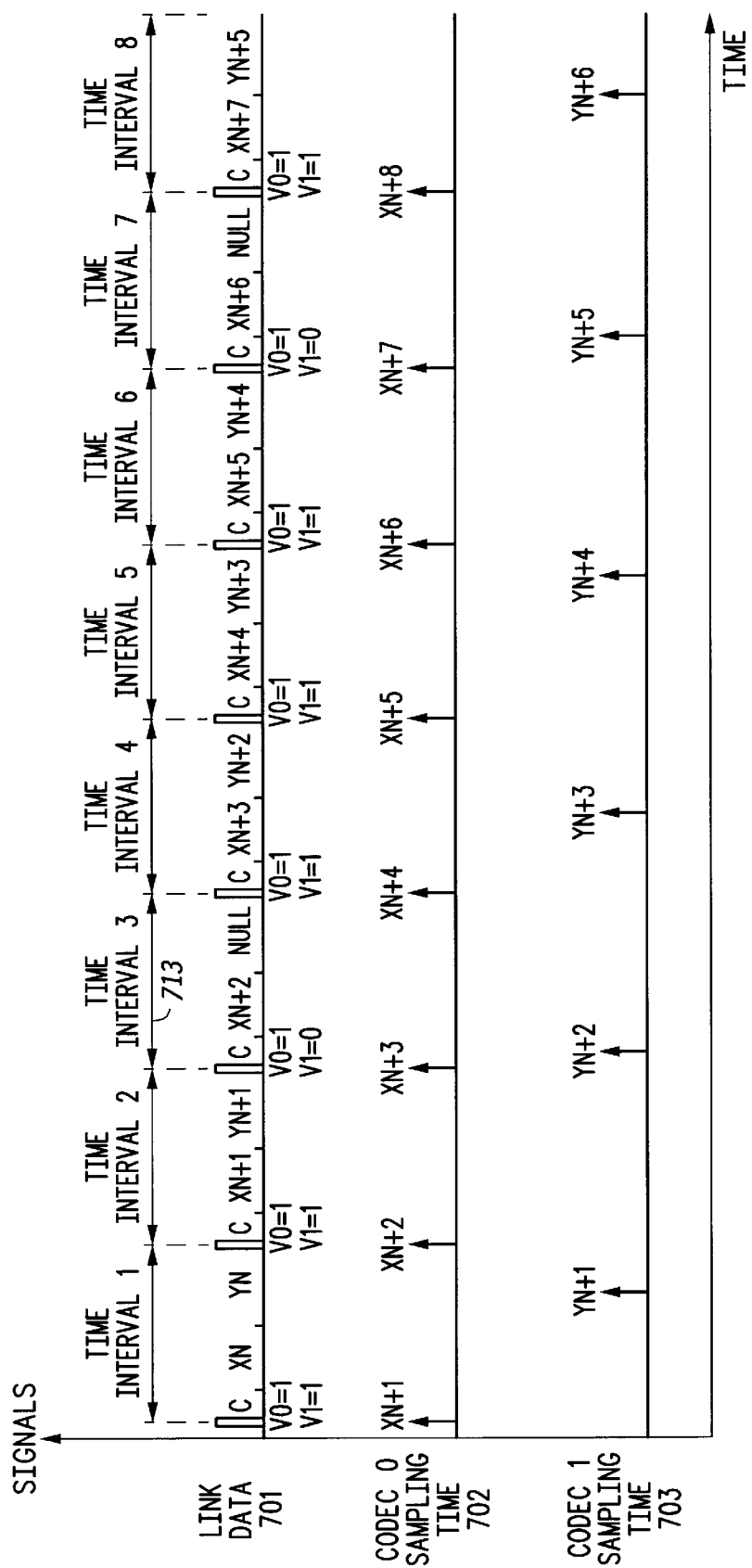
FIG. 7 is a timing diagram illustrating the operation of the invention.

FIG. 7 is a timing diagram illustrating the operation of the invention. The X axis indicates elapsed time. In the example in FIG. 7, four different events are illustrated. The bottom two time lines 702, 703 represent data for two different channels or CODECs operating at different rates. A first channel (X) 702 is operating at a slightly higher data rate than a second channel (Y) 703. In this example then, the frame rate (FSYNC 132 asserted) is set to the data rate of the higher speed channel (X). The top line represents the multiplexed data 701. Thus, every outgoing frame contains a valid data word ($DW_X$) for the faster channel. Since the data rate for the slower channel (Y) is lower than the frame rate (FSYNC 132), frames containing data words ($DW_Y$) containing invalid data are periodically transmitted for the slower channel(s). This is indicated in those frames by a corresponding control word validity bit ($V_1$) not being set as occurring in time interval 3 703, and with a corresponding "NULL" data codeword.

Figure 8:
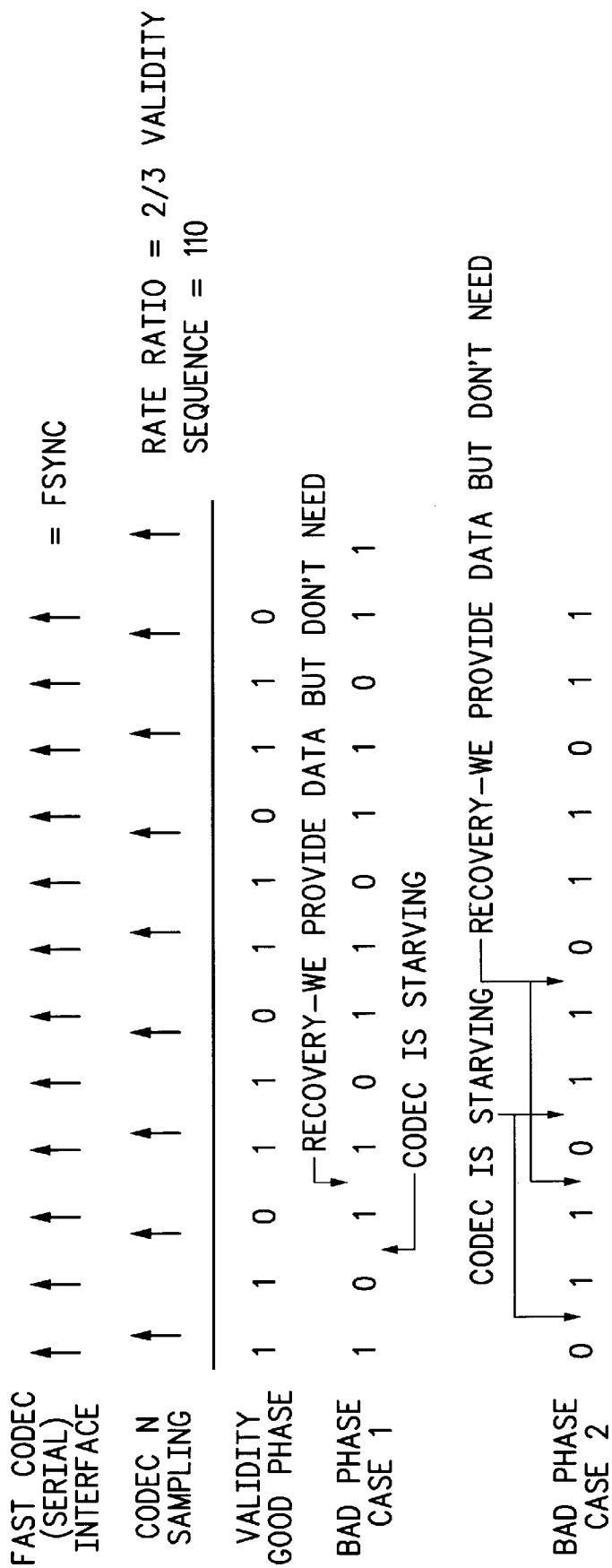
FIG. 8 is a timing diagram illustrating the operation of the transmit logic circuit previously depicted in FIG. 4.

FIG. 8 is a timing diagram illustrating the operation of the transmit logic circuit 114 previously depicted in FIG. 4. Here, a valid bit pattern of a transmit sequence is depicted with respect to the timing of the serial interface 102. In this example, the ratio of the CODEC $122_i$ speed to the frame rate (FSYNC 132) is 2:3. Therefore, the preferred bit pattern is 110, binary. However, each CODEC $122_i$ is asynchronous with respect to the serial interface 110. Consequently, this bit pattern could effectively be interpreted at the destination CODEC $122_i$ as 110, 101, or 011. The possibility exists that serial interface 112 will provide data codewords (V=1) to a CODEC $122_i$ when it does not need it or will not supply data codewords (V=0) when the CODEC $122_i$ does need data.

In a first case, the validity bit pattern phase '110' is correct with respect to the sampling time of the CODEC $122_i$. This scenario is depicted by the line "VALIDITY GOOD PHASE" 801. Here, host processor 102 supplies data codewords to the CODEC $122_i$ precisely when required.

In a second case, the validity bit pattern phase '110' is shifted in time to '101' with respect to the sampling time of the CODEC $122_i$. This scenario is depicted by the line "BAD CASE 1" 802. Here, host processor 102 fails to provide a data word when needed. The CODEC $122_i$ "starves" for data in the second frame. Later, host processor 102 provides two data codewords before either are need by the CODEC $122_i$. This occurs in the fourth and fifth frames. This situation is handled through the use of a two entry $FIFO_i$ queue $404_i$ by the transmit logic 114 to provide uninterrupted flow of data to CODEC $122_i$.

In the third case, the validity bit pattern phase '110' is shifted in time to '011' with respect to the sampling time of the CODEC $122_i$. This scenario is depicted by the line "BAD CASE 2" 803. Here, host processor 102 starves the CODEC $122_i$ in the first frame. Again, host processor 102 provides two data codewords before either are need by the CODEC $122_i$. This occurs in the second and third frames. Again, the situation is resolved correctly through the use of a two-entry FIFO $404_i$.

The foregoing description and illustrations contained herein demonstrate many of the advantages associated with the present invention. In particular, are provided a circuit and serial protocol that support CODECs operating at different, varying rates of speed that require no dedicated hardware on the host processor.

Each CODEC has its own data rate that does not need to be known a priori or 'allocated' through complex control channel data. The data rate of each source/destination can be dynamically changed without disturbing serial interface formatting and the type of processing performed by the host. The serial link is compatible with 'any' standard serial communication port on a standard processor. Alternatively, a parallel port and link may be utilized. The serial data format can be readjusted for different codeword sizes (8, 16, 24, or 2 bits per codeword) with minor hardware change. The serial link bit clock is adjusted to the highest rate of the two CODECs thus minimizing the processing/buffering required on the host. In an application where CODECs are implemented as oversampling converters, the serial bit clock can be set to the oversampling clock, thus reusing already existing clock generation hardware.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A data processing system comprising:
   a first data line;
   a first subsystem; and
   a second subsystem coupled to the first subsystem by the first data line,
   wherein:
   data is transmitted from the first subsystem to the second subsystem on the first data line utilizing a first plurality of signals forming a communications protocol,
   said communications protocol utilizes a frame having an ordered sequence of bits and comprising:
   a control codeword comprising a first validity bit and a second validity bit,
   a first data codeword corresponding to a first channel, and
   a second data codeword corresponding to a second channel,
   the first data codeword is valid when the first validity bit is in a first state, and the first data codeword is not valid when the first validity bit is in a second state,
   the second data codeword is valid when the second validity bit is in the first state, and the second data codeword is not valid when the second validity bit is in the second state,
   the first validity bit and the second validity bit are set or cleared on a frame by frame basis in the first subsystem, and
   a first frame is transmitted from the first subsystem to the second subsystem on the first data line.

2. The data processing system in claim 1 which further comprises:
   a first CODEC corresponding to the first data codeword and the first validity bit; and
   a second CODEC corresponding to the second data codeword and the second validity bit.

3. The data processing system in claim 2 wherein:
   which further comprises:
   a clock generator which generates a bit clock signal and a frame sync signal;
   wherein:

the ordered sequence of bits in the first frame are clocked by the bit clock signal, and a rate of the frame sync signal is greater than or equal to a codeword framing rate of the first CODEC and to a codeword framing rate of the second CODEC.

4. The data processing system in claim 3, which further comprises:

a third CODEC corresponding to a third data codeword in the first frame and a third validity bit in the control codeword in the first frame, wherein:

the rate of the bit clock signal is greater than or equal to a codeword framing rate of the third CODEC.

5. The data processing system in claim 3, wherein:

the rate of the bit clock signal is dynamically adjustable to compensate for a varying active CODEC bit rate.

6. The data processing system in claim 1 which further comprises:

a host processor having a serial interface.

7. The data processing system in claim 6 wherein:

the serial interface transmits the first frame across the first data line.

8. The data processing system in claim 6 wherein:

the serial interface receives the first frame across the first data line.

9. The data processing system in claim 6 wherein:

the serial interface transmits the first frame across the first data line, a second frame is a frame transmitted from the second subsystem to the first subsystem on a second data line, and the serial interface receives the second frame across the second data line.

10. The data processing system in claim 9 which further comprises:

a transmit logic that receives the first frame transmitted on the first data line; and a receive logic that receives the second frame transmitted on the second data line.

11. The data processing system in claim 1 which further comprises:

a second data line coupling the second subsystem to the first subsystem, wherein:

data is transmitted from the second subsystem to the first subsystem on the second data line utilizing a second plurality of signals forming the communications protocol, and a second frame is a frame transmitted from the second subsystem to the first subsystem on the second data line.

12. The data processing system in claim 11 which further comprises:

a bit clock signal line providing a bit clock signal, wherein:

the ordered sequence of bits in the first frame and in the second frame are clocked by the bit clock signal.

13. The data processing system in claim 12 which further comprises:

a frame sync signal line providing a frame sync signal;

wherein:

a start of the first frame and of the second frame is indicated by assertion of the frame sync signal.

14. The data processing system in claim 13 which further comprises:

a clock generator which generates the bit clock signal and the frame sync signal.

15. The data processing system in claim 11 which further comprises:

a frame sync signal line providing a frame sync signal;

wherein:

a start of the first frame and of the second frame is indicated by assertion of the frame sync signal.

16. The data processing system in claim 1 wherein:

the first data line is a serial data line.

17. The data processing system in claim 1 wherein:

the first data line is a parallel data line.

18. The data processing system in claim 1 which further comprises:

a host processor having a serial interface, a second data line coupling the second subsystem to the first subsystem, wherein:

data is transmitted from the second subsystem to the first subsystem on the second data line utilizing a second plurality of signals forming the communications protocol, and a second frame is transmitted from the second subsystem to the first subsystem on the second data line;

a first CODEC corresponding to the first data codeword and the first validity bit; and a second CODEC corresponding to the second data codeword and the second validity bit;

a frame sync signal line providing a frame sync signal, wherein:

a start of the first frame and of the second frame is indicated by assertion of the frame sync signal; and a clock generator which generates a bit clock signal and the frame sync signal, wherein:

the ordered sequence of bits in the first frame and in the second frame are clocked by the bit clock signal, and a rate of the frame sync signal is greater than or equal to a codeword framing rate of the first CODEC and to a codeword framing rate of the second CODEC.

19. A method of transmitting data for a plurality of channels operating at a corresponding plurality of data rates, said method comprising:

A) determining a channel table validity bit for each of the plurality of channels, B) initializing a channel index, C) select a channel table utilizing the channel index as a selected channel table;

D) setting a frame validity bit in a frame buffer based on the channel table validity bit in the selected channel table;

E) if the channel table validity bit in the selected channel table is in a first state, moving a codeword for a channel corresponding to the channel index into a codeword in the frame buffer indexed by the channel index; and F) transmitting the frame buffer.

20. The method in claim 19 which further comprises:

G) incrementing the channel index, and

H) repeating the step (C) of selecting the channel table, the step (D) of setting a frame validity bit, and if the channel table validity bit in the selected channel table is in the first state, the step (E) of moving the codeword as a loop while there are more channel to process.

21. A method of transmitting data received from a plurality of data sources operating at a corresponding plurality of data rates, said method comprising:

processing a first data codeword received from a first data source comprising:
- receiving the first data codeword from the first data source,
- storing the first data codeword in a first memory, and marking the first memory as valid;

processing a second data codeword received from a second data source comprising:
- receiving the second data codeword from the second data source,
- storing the second data codeword in a second memory, and
- marking the second memory as valid;

building a frame to transmit, wherein:
- the frame comprises:
  - a control codeword containing a first validity bit and a second validity bit,
  - the first data codeword, and
  - the second data codeword, said building comprising:
- testing whether the first memory is marked valid,
- if the first memory is marked valid, processing the first data codeword from the first data source comprising:
  - moving the first data codeword from the first memory to the first data codeword in the frame,
  - setting the first validity bit in the frame to a first logical state,
  - marking the first memory as invalid, otherwise
  - setting the first validity bit in the frame to a second logical state,
- testing whether the second memory is marked valid, and
- if the second memory is marked valid, processing the second data codeword from the second data source comprising:
  - moving the second data codeword from the second data source to the second data codeword in the frame,
  - setting the second validity bit in the frame to a first logical state, and
  - marking the second memory as invalid, otherwise
  - setting the second validity bit in the frame to a second logical state; and transmitting the frame on a data line.

* * * * *